United States Patent [19]

Sekikawa

[11] Patent Number: 4,633,409
[45] Date of Patent: Dec. 30, 1986

[54] NUMERICAL CONTROL DEVICE
[75] Inventor: Katsuhide Sekikawa, Aichi, Japan
[73] Assignee: Mitsubishi Denki Kabushiki Kaisha, Tokyo, Japan
[21] Appl. No.: 613,472
[22] Filed: May 23, 1984
[30] Foreign Application Priority Data May 23, 1983 [JP] Japan ................... 58-90273

[51] Int. Cl.⁴ .................. G06F 15/46; G05B 9/00
[52] U.S. Cl. ..................... 364/474; 82/2 B; 318/568; 364/171; 364/184
[58] Field of Search ............. 364/474, 475, 167–171, 364/191–193, 184; 318/568, 563, 565; 82/2 R, 2 B, 3, 31

[56] References Cited

U.S. PATENT DOCUMENTS

| 4,033,206 | 7/1977 | Morita et al. ............ 364/474 X |
| 4,204,144 | 5/1980 | Hill ..................... 318/568 |
| 4,393,449 | 7/1983 | Takeda et al. ........... 364/171 X |
| 4,490,781 | 12/1984 | Kishi et al. ............ 364/171 X |
| 4,521,860 | 7/1985 | Kanematsu et al. ........ 364/171 X |
| 4,530,046 | 7/1985 | Munekata et al. ......... 364/474 X |
| 4,549,270 | 10/1985 | Fukumura et al. ......... 364/191 X |

FOREIGN PATENT DOCUMENTS 0121100 10/1984 European Pat. Off. .

Primary Examiner—Joseph Ruggiero
Attorney, Agent, or Firm—Sughrue, Mion, Zinn, Macpeak & Seas

[57] ABSTRACT

A numerical control device stores dimensional details of a workpiece, a chuck, and a tailstock as coordinate data items in a memory, computes the positions and shapes of the workpiece, the chuck, and the tailstock based on the coordinate data items, and displays the workpiece, the chuck, and the tailstock as graphic patterns on a display unit based on the computed results. The computation is simplified by using coordinates of a relative coordinate system as the coordinate data items for graphic display.

3 Claims, 14 Drawing Figures

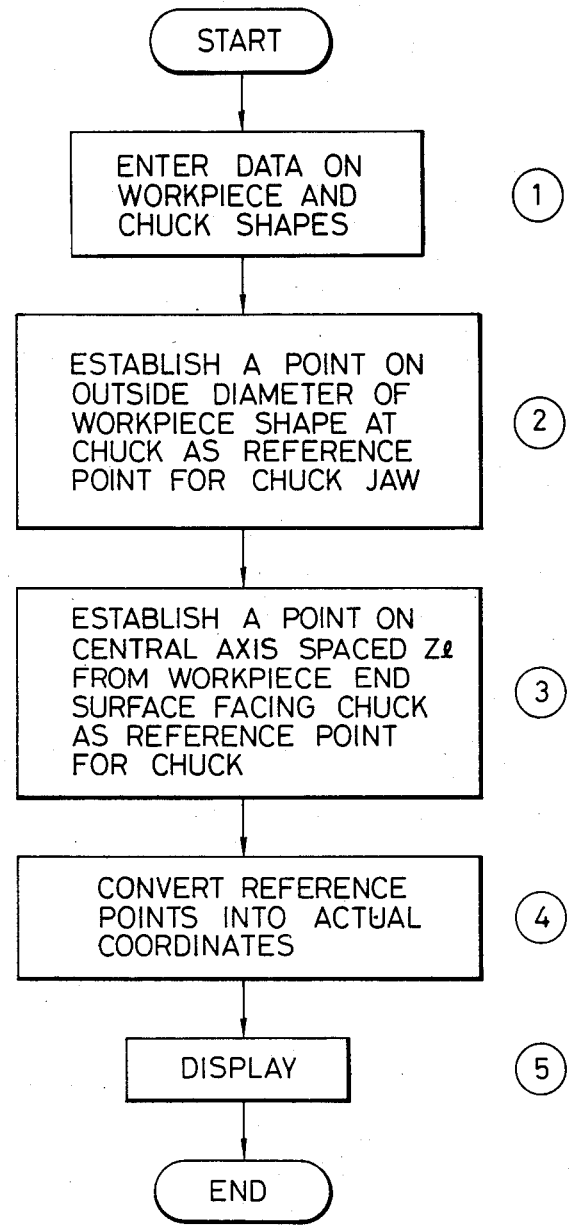

NUMERICAL CONTROL DEVICE

BACKGROUND OF THE INVENTION

The present invention relates to a numerical control device (hereinafter referred to as an "NC device") for use with a machine tool, for example, and more particularly to an NC device including a graphic display unit.

NC machining devices machine a workpiece by specifying the position of a tool with respect to the workpiece in the form of corresponding numerical information. The NC machining device can machine workpieces of complex configuration with ease and high accuracy at a high production rate.

FIG. 1 of the accompanying drawings schematically shows a general machine tool controlled by a conventional NC device, the machine tool being a lathe by way of illustrative example. A cylindrical workpiece 11 fixedly clamped by a chuck 10 rotatable about a Z-axis has one end supported by a tip 12a of a tailstock 12. A cutting tool 14 is secured to a turret or tool base 13. For cutting the workpiece 11, the turret 13 is moved in the direction of the arrow Z to cause the cutting tool 14 to cut the workpiece 11.

Where the NC device includes a graphic display unit, the shape of the workpiece 11, a cutting path of the tool 14, and a finished shape of the workpiece 11 are displayed on the display unit for checking and machining program for possible interference between the workpiece and the tool and monitoring the cutting condition. The machining program is checked by displaying the tool path as indicated by dotted lines as shown, for example, in FIG. 2 of the accompanying drawings. Whether the workpiece and the tool interfere with each other or not is checked by the determined values of functions which express the shape and position of holder mechanisms composed of the chuck and tailstock. However, since the holder mechanisms have not been displayed as graphic patterns, it has heretofore not been possible to visually check for any interference between the workpiece and the tool through graphic representation.

SUMMARY OF THE INVENTION

It is an object of the present invention to provide an NC device capable of automatically converting the shape of holder mechanisms of a lathe, such as a chuck and a tailstock, into a shape of a tool for holding a workpiece shape and displaying such a converted shape by processing data indicative of the shape of the workpiece.

The above object can be achieved by a numerical control device comprising a controller for controlling a machine tool having first and second holder mechanisms for jointly holding a workpiece, the controller having means for displaying the workpiece as automatically held by the first and second holder mechanisms on a graphic display unit in accordance with the dimensional details of the workpiece, dimensional details of the first holder mechanism, and dimensional details of the second holder mechanism entered into the controller.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a flowchart of processing steps according to the present invention;

DESCRIPTION OF THE PREFERRED EMBODIMENTS

Figure 1:
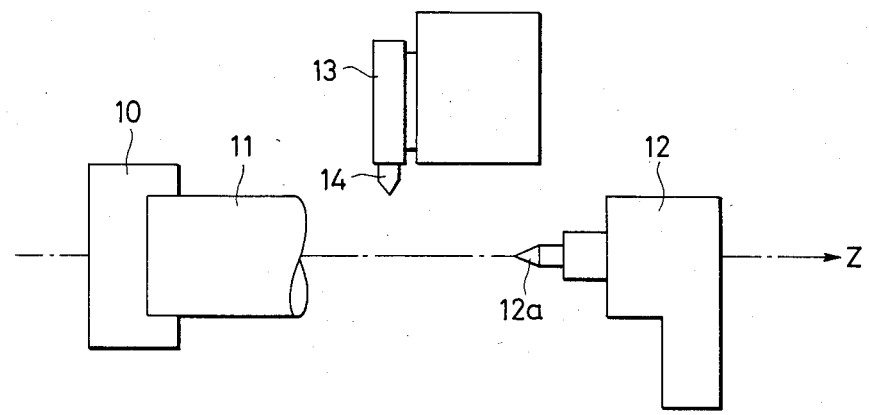
FIG. 1 is a schematic view of a lathe to which a conventional NC device is applied.
Figure 2:
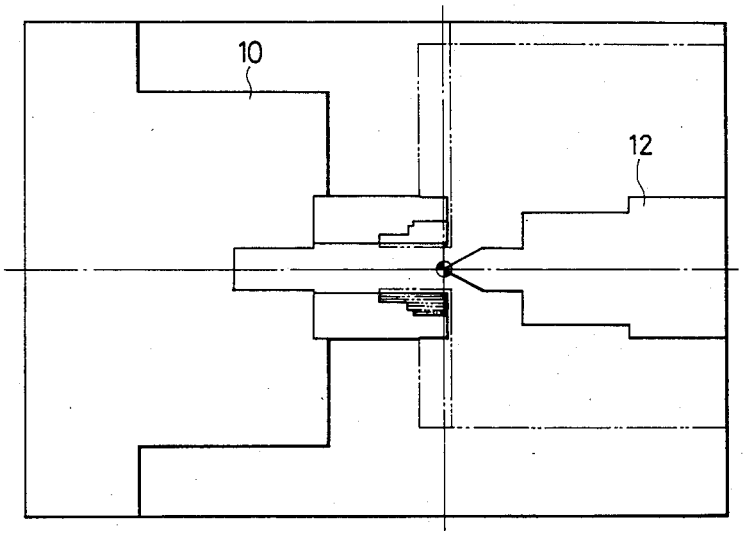
FIG. 2 is a schematic view explanatory of the checking of a machining program for the lathe shown in FIG. 1.

According to the present invention, holder mechanisms such as indicated by reference numerals 10, 12 in FIG. 1 are displayed. A specific arrangement of the present invention will hereinafter be described.

Figure 3A:
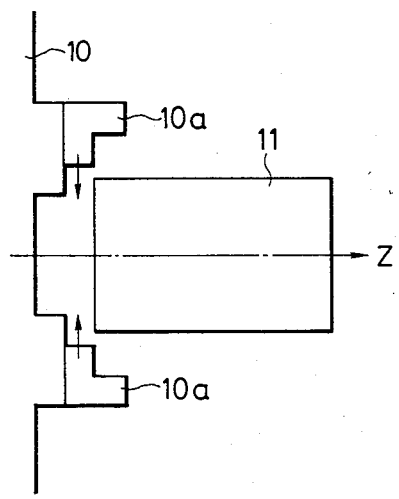
FIGS. 3A and 3B are views showing the relationship between a workpiece shape and a chuck.
Figure 3B:
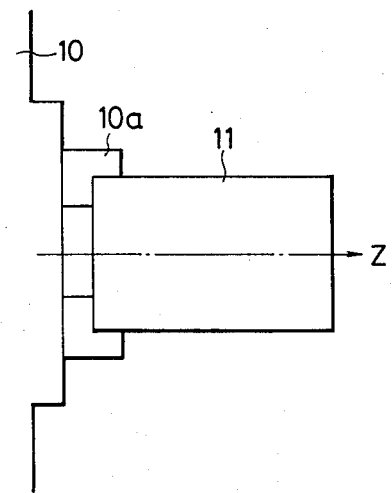

FIGS. 3A and 3B are illustrative of graphic patterns such as that of a lathe to be applied to a graphic display unit. A first holder mechanism is composed of a chuck 10 and chuck jaws 10a for holding a workpiece 11. In case the chuck 10 is displayed as fixed in position, there is an instance where the workpiece 11 cannot be held by the chuck 10 as shown in FIG. 3A since the workpiece 11 may not be constant in shape and size. Dependent on the shape and size of the workpiece 11, the graphic pattern is converted so that the chuck jaws 10a will be moved so as to be able to hold the workpiece 11. FIG. 3B illustrates the graphic pattern as thus converted.

Figure 10A:
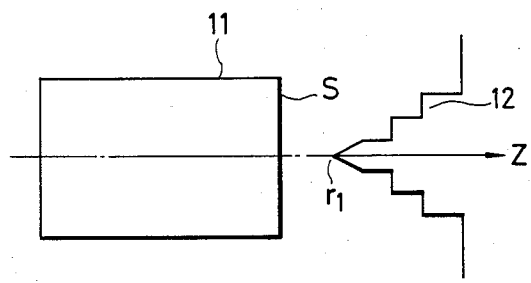
FIGS. 10A and 10B are schematic views showing the relationship between a workpiece shape and a tailstock.
Figure 10B:
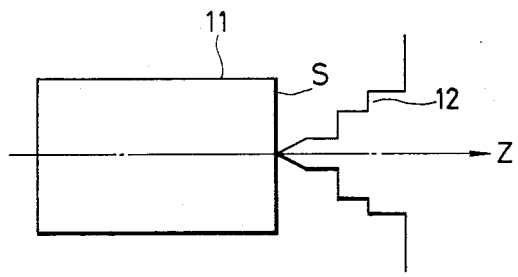

A second holder mechanism is composed of a tailstock 12 having a tip 12a as shown in FIGS. 10A and 10B.

Figure 4:
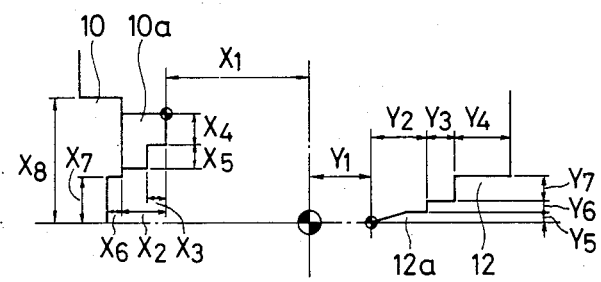
FIG. 4 is a schematic diagram showing dimensional details of a chuck and a tailstock.

For a better understanding of the present invention, FIG. 4 shows dimensional details of the first and second holder mechanisms. Denoted in FIG. 4 at $X_1$–$X_8$ are dimensional details of the first holder mechanism, and $Y_1$–$Y_7$ dimensional details of the second holder mechanism.

An appropriate example of graphic pattern conversion will be described with reference to FIGS. 5A and 5B.

Figure 5A:
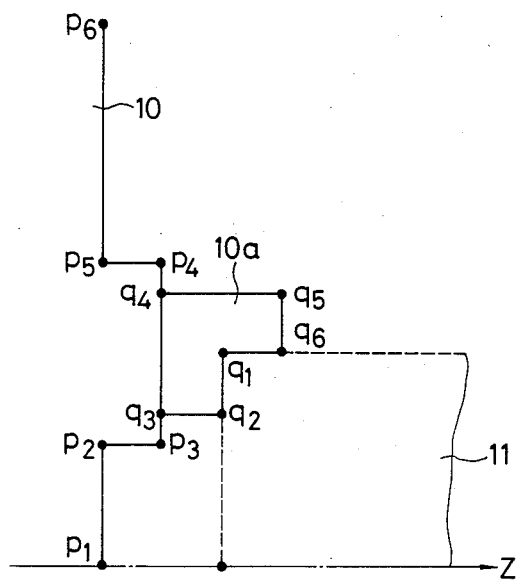
FIGS. 5A and 5B are diagrams showing coordinate data for graphic display.
Figure 5B:
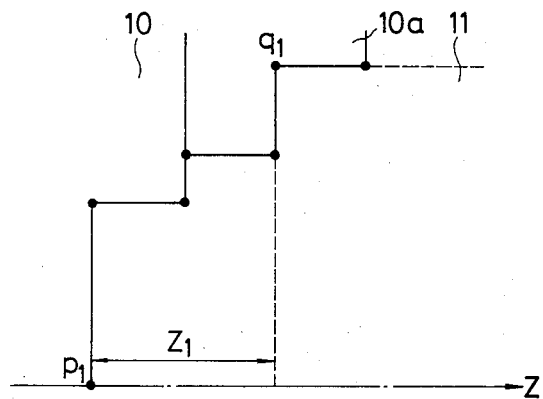

Data items to be displayed as graphic patterns are all expressed as coordinate data items as shown in FIGS. 5A and 5B. In FIGS. 5A and 5B, coordinate data items for the chuck 10 are indicated by $P_n$ (n=1 through 6) and coordinate data items for the chuck jaw 10a are indicated by $q_n$ (n=1 through 6), with $p_1$, $q_1$ serving as reference coordinates and $p_n$, $q_n$ (n=2 through 6) as relative coordinates from $p_1$, $q_1$.

The relative coordinates are used for the reason that, with such relative coordinates, if a reference point is positionally changed, then all points in a certain coordinate system having such a reference point as a reference will be renewed, but with all points expressed only by absolute coordinates, if a positional change were to be made, the extent of such a positional change would have to be computed for all points in the absolute coordinate system.

Figure 6:
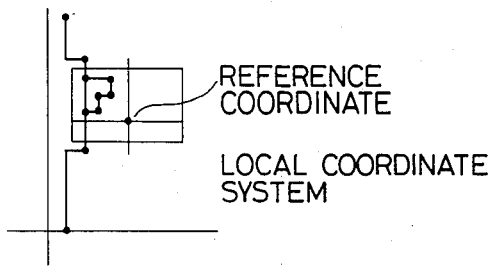
FIG. 6 is a diagram depicting the relationship between a reference coordinate system and a local coordinate system.

Reference coordinates will be simply described. Reference coordinates means an origin of a local coordinate system as shown in FIG. 6. The reference coordinates are indicative of a single coordinate set or value when viewed from an outer coordinate system.

Figure 7A:
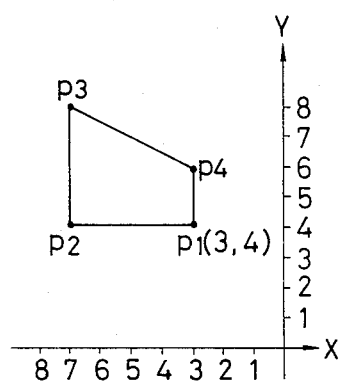
FIGS. 7A and 7B are diagrams illustrating the concepts of an absolute coordinate system and a relative coordinate system, respectively.
Figure 7B:
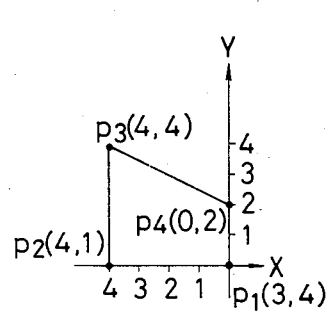

With such a coordinate data construction, the coordinates can be indicated as shown in FIGS. 7A and 7B. Designated at $p_1$ in FIG. 7A is a reference point, while the other points are representative of values of an absolute coordinate system with $p_1$ being the origin. FIG. 7B shows a relative coordinate system having the reference point $p_1$ as the origin. As shown in FIGS. 7A and 7B, when a graphic pattern of $p_n$ (n=1 through 4 in the illustrated example) is to be moved, only the reference coordinates $p_1$ are renewed, and offsets ($p_2$ through $p_4$) are added to the reference coordinates $p_1$ to translate the same for thereby obtaining actual coordinates, whereupon the pattern is displayed.

Figure 9:
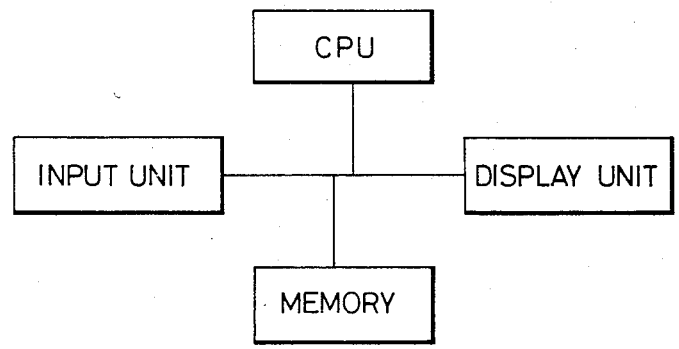
FIG. 9 is a block diagram of a hardware system used for executing the process illustrated in FIG. 8.

The reference coordinates $p_1$, $q_1$ of the chuck 10 and the chuck jaw 10a as shown in FIGS. 5A and 5B can be determined by an algorithm illustrated in FIG. 8. The algorithm of FIG. 8 is executed by a system shown in FIG. 9 which operates as follows:

Data items indicative of the shape of the holder mechanism and of the diameter of the workpiece are entered through a input unit of the NC device and stored in a memory. Based on these data items, a CPU computes the position of a chuck jaw, generates a pattern corresponding to the shape thereof, and displays the same on a display unit.

The flowchart of FIG. 8 is composed of successive steps 1 1 through 5. A workpiece shape and a chuck shape are entered as coordinate data items in step 1. Coordinates on the outside diameter of the workpiece shape at the chuck are established as a reference point for the chuck jaw in the step 2. A point on the central axis which is spaced a distance $Z_1$ (FIG. 5B) from the end of the workpiece which faces the chuck is regarded as a reference point for the chuck in step 3. Actual coordinates can be determined by adding relative coordinates to the reference points thus defined in step 4. A chuck shape converted through linear interpolation of the actual coordinates is completely displayed together with the actual machining condition in step 5.

FIGS. 10A and 10B are illustrative of the display of the tailstock 12 or the second holder mechanism. Reference coordinates $r_1$ (FIG. 10A) can be established as shown in FIG. 10B by setting a workpiece end surface S on the Z-axis and setting X at "0" (on the Z-axis). The following process is the same as described with respect to the chuck 10, i.e., the shape of the tailstock is defined by a local coordinate system, and the tip of the tailstock is given by reference coordinates, which are translated and displayed.

While in the foregoing embodiment the NC device has been described as being used with a lathe, the present invention is applicable to NC devices used in combination with various other machine tools such as a machining center.

Although a certain preferred embodiment has been shown and described, it should be understood that many changes and modifications may be made therein without departing from the scope of the appended claims.

I claim:

1. A numerical control device comprising:
   a controller for controlling a machine tool having first and second holder mechanisms for jointly holding a workpiece; and
   a graphic display unit coupled to said controller for displaying the workpiece as held by said first and second holder mechanisms in accordance with data indicative of dimensional details of said workpiece, dimensional details of said first holder mechanism, and dimensional details of said second holder mechanism entered into said controller.

2. The numerical control device according to claim 1, wherein the dimensional details of said first and second holder mechanisms are entered as coordinate data items.

3. The numerical control device according to claim 2, wherein said coordinate data items comprise coordinates of a relative coordinate system.

* * * * *